United States Patent
Uhrenholt

(10) Patent No.: US 11,138,786 B1
(45) Date of Patent: Oct. 5, 2021

(54) VERTEX ATTRIBUTE REPRESENTATION IN GRAPHICS PROCESSING SYSTEMS FOR EXECUTING A GRAPHICS PROCESSING PIPELINE

(71) Applicant: Arm Limited, Cambridge (GB)

(72) Inventor: Olof Henrik Uhrenholt, Lomma (SE)

(73) Assignee: Arm Limited, Cambridge (GB)

( * ) Notice: Subject to any disclaimer, the term of this patent is extended or adjusted under 35 U.S.C. 154(b) by 3 days.

(21) Appl. No.: 16/878,131

(22) Filed: May 19, 2020

(51) Int. Cl.
  *G06T 1/20* (2006.01)
  *G06T 15/80* (2011.01)

(52) U.S. Cl.
  CPC .............. *G06T 15/80* (2013.01); *G06T 1/20* (2013.01)

(58) Field of Classification Search
  CPC .............. G06T 1/20; G06T 15/80; G06T 1/60
  USPC .................................. 345/426, 530
  See application file for complete search history.

(56) References Cited

U.S. PATENT DOCUMENTS

| 2014/0267232 | A1* | 9/2014 | Lum ..................... G06T 19/20 345/419 |
| 2017/0293995 | A1* | 10/2017 | Saleh .................... G06T 15/005 |
| 2018/0300915 | A1* | 10/2018 | Heggelund .......... G06T 15/005 |

* cited by examiner

*Primary Examiner* — Jacinta M Crawford
(74) *Attorney, Agent, or Firm* — Vierra Magen Marcus LLP

(57) ABSTRACT

A method of operating a graphics processor comprises snapping a position of a vertex to an array of vertex positions to produce one or more first representations of the position of the vertex, and converting each of one or more of the first representations of the position of the vertex into a second representation of the position of the vertex. At least one bit of the second representation of the position of the vertex is unused to represent the position of the vertex. The method comprises using the at least one bit of the second representation of the position of the vertex to represent the one or more other vertex attributes to form a representation of both the position of the vertex and the one or more other vertex attributes, and storing a representation of both the position of the vertex and the one or more other vertex attributes.

20 Claims, 7 Drawing Sheets

VERTEX ATTRIBUTE REPRESENTATION IN GRAPHICS PROCESSING SYSTEMS FOR EXECUTING A GRAPHICS PROCESSING PIPELINE

BACKGROUND

The technology described herein relates to the processing of computer graphics, and in particular to a method of operating a graphics processor.

Graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles.

Each primitive is at this stage defined by and represented as a set of vertices. Each vertex for a primitive has associated with it a set of data (such as position, colour, texture and other attributes data) representing the vertex. This "vertex data" is then used when rasterising and rendering the primitive(s) to which the vertex relates in order to generate the desired render output of the graphics processing system.

Before primitives and their vertices can be processed by a fragment processing pipeline of the graphics processing pipeline, the attributes of the vertices originally defined for a given graphics processing output (e.g. draw call) are usually subjected to initial so-called "vertex shading" operations (by a vertex processing pipeline of the graphics processing pipeline) that operate to transform the attributes for each originally defined vertex into a desired form for the subsequent graphics processing operations (by the fragment processing pipeline).

This may comprise, in particular, transforming the originally defined vertex position attributes from the world or user space that they are initially defined for to the screen space that the output of the graphics processing system is to be displayed in.

Once primitives and their vertices have been generated and defined, they can be further processed by the fragment processing pipeline, in order to generate the desired graphics processing output (render output), such as a frame for display.

This usually involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively.

When rendering a render output, e.g. frame for display, there is typically a trade-off between image quality and processing effort. For example, "supersampling" arrangements attempt to increase image quality by increasing the number of colours that are sampled (rendered), but this typically involves a greater processing effort. Conversely, decreasing the number of colours that are sampled (rendered) will usually reduce processing requirements, but at the expense of reduced image quality.

"Variable Rate Shading" (VRS) (as defined in the DirectX and Vulkan specifications) is a technique that allows this trade-off between image quality and processing effort to be varied across a render output, e.g. frame for display. In particular, Variable Rate Shading (VRS) allows the area of a render output, e.g. frame, that a single colour is sampled (rendered) for, i.e. the "shading rate", to vary within the render output.

Thus, in Variable Rate Shading (VRS), different shading rates can be used to render a render output such that, for example, a single sampled (rendered) colour is used for a single output pixel, whereas elsewhere in the output, a single sampled (rendered) colour is used for each output pixel in a block of plural output pixels, thereby reducing the processing effort for those pixels.

The Applicants believe that there remains scope for improvements to graphics processors and to graphics processing.

BRIEF DESCRIPTION OF THE DRAWINGS

Various embodiments of the technology described herein will now be described by way of example only and with reference to the accompanying drawings, in which.

Like reference numerals are used for like elements throughout the figures, where appropriate.

DETAILED DESCRIPTION

Figure 1:
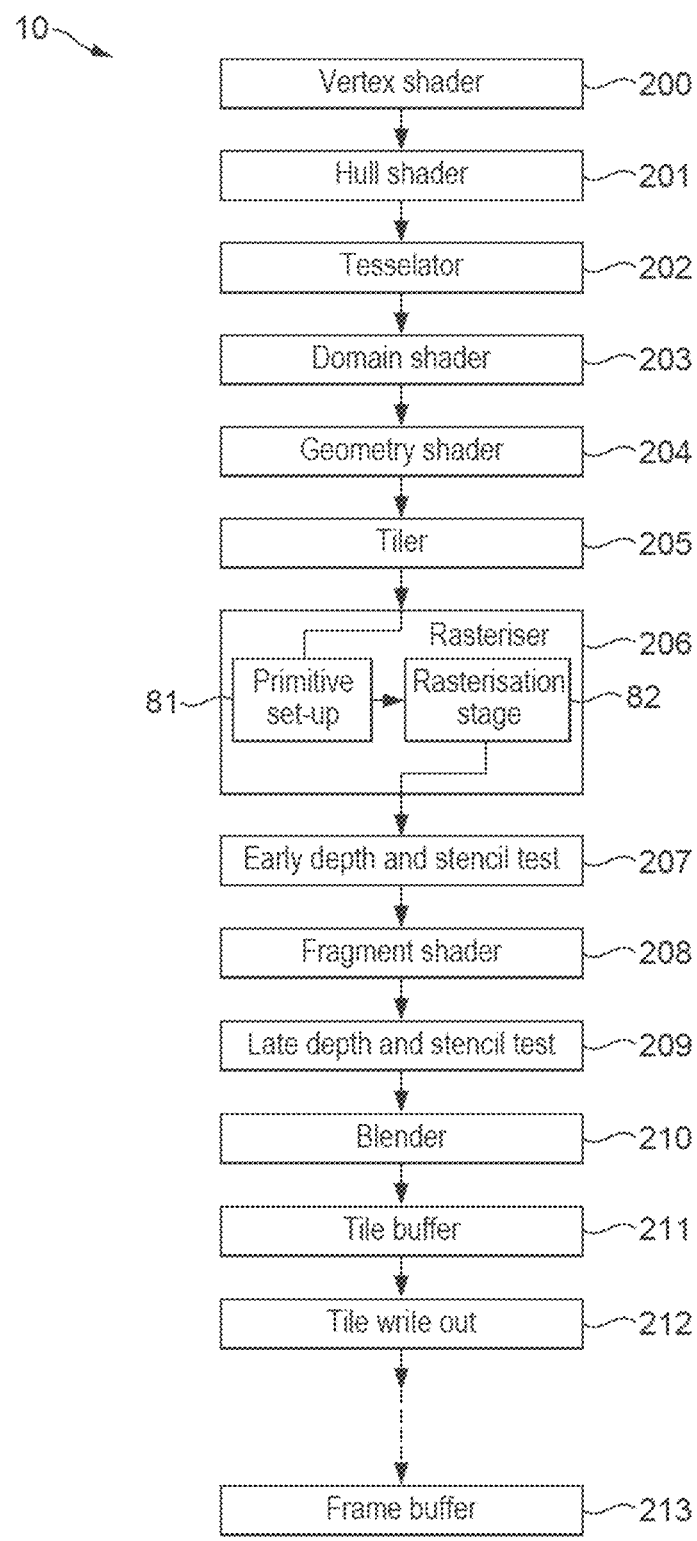
FIG. 1 shows schematically a graphics processing pipeline in accordance with various embodiments.

A first embodiment of the technology described herein comprises a method of operating a graphics processor that is configured to execute a graphics processing pipeline, the method comprising:

providing information representing a vertex of a plurality of vertices that define one or more primitives to be rendered by the graphics processing pipeline, wherein the information comprises at least a position of the vertex and a shading rate for the vertex;

snapping the position of the vertex to an array of vertex positions so as to produce one or more first representations of the position of the vertex;

converting each of one or more of the one or more first representations of the position of the vertex into a second representation of the position of the vertex, wherein at least one bit of the second representation of the position of the vertex is unused to represent the position of the vertex;

using the at least one bit of the second representation of the position of the vertex to represent the shading rate for the vertex, so as to form a representation of both the position of the vertex and the shading rate for the vertex; and storing a representation of both the position of the vertex and the shading rate for the vertex.

A second embodiment of the technology described herein comprises a graphics processor configured to execute a graphics processing pipeline, the graphics processor comprising:

processing circuitry configured to receive information representing a vertex of a plurality of vertices that define one or more primitives to be rendered by the graphics processing pipeline, wherein the information comprises at least a position of the vertex and a shading rate for the vertex;

processing circuitry configured to snap the position of the vertex to an array of vertex positions so as to produce one or more first representations of the position of the vertex;

processing circuitry configured to convert each of one or more of the one or more first representations of the position of the vertex into a second representation of the position of the vertex, wherein at least one bit of the second representation of the position of the vertex is unused to represent the position of the vertex;

processing circuitry configured to use the at least one bit of the second representation of the position of the vertex to represent the shading rate for the vertex, so as to form a representation of both the position of the vertex and the shading rate for the vertex; and storing circuitry configured to store a representation of both the position of the vertex and the shading rate for the vertex.

Various embodiments are directed to a method of operating a graphics processor in which a shading rate is defined and used when rendering one or more primitives to be rendered. That is, various embodiments are directed to a method in which a render output can be generated using one or more of plural different possible shading rates, i.e. so-called Variable Rate Shading (VRS).

In Variable Rate Shading (and in embodiments), the area of the render output for which a single colour is rendered (sampled) (by a renderer of the graphics processing pipeline) can be one of plural different possibilities. For example, when a relatively fine shading rate is used, a single colour may be sampled (by the renderer) for an area of the render output corresponding to only a single pixel. When a coarser shading rate is used, however, a single colour may be sampled (by the renderer) for an area of the render output corresponding to each pixel in a block of plural pixels.

In various embodiments, when rendering a primitive, a shading rate is used which is determined based (at least in part) on a shading rate that is defined for one or more or each vertex that defines the primitive, i.e. based on a per-vertex shading rate.

In conventional Variable Rate Shading arrangements, per-vertex shading rates are supplied (from the vertex shading pipeline) to the renderer (of the fragment processing pipeline) by the graphics processor storing the per-vertex shading rates in a vertex attribute buffer, and then subsequently reading the per-vertex shading rates when needed from the vertex attribute buffer. However, storing per-vertex shading rate(s) in and then reading the per-vertex shading rate(s) from the vertex attribute buffer uses memory bandwidth, and therefore power.

Various embodiments provide a technique in which per-vertex shading rate(s) can be supplied (from the vertex shading pipeline) to a renderer (of the fragment processing pipeline) in a more efficient manner, i.e. in a manner which reduces memory bandwidth and power usage.

In various embodiments, this is done by encoding a vertex's shading rate and the position of the vertex together in the same representation(s) (e.g. floating point representation(s)), i.e. so as to form one or more (e.g. floating point) representations that each represent both the shading rate for the vertex and the position of the vertex. Each representation can then be stored in the vertex attribute buffer, e.g. such that both the position of the vertex and its shading rate are stored using the same store operation(s) (and will be read using the same read operation(s)).

In this regard, in graphics processing pipelines, vertex positions are typically "snapped" to an array of vertex positions (a "vertex position grid") as part of the vertex shading operations (by a vertex processing pipeline of the graphics processing pipeline) that operate to transform vertex attributes into a desired form for the subsequent graphics processing operations (by a fragment processing pipeline of the graphics processing pipeline). In particular, once the originally defined vertex positions have been transformed from the world or user space that they are initially defined for to a screen space that the output of the graphics processing system is to be displayed in, the resulting ("post-transform") screen space position (e.g. comprising two screen space (X, Y) coordinates) of each vertex is typically snapped to a screen space array of vertex positions (a screen space grid) which corresponds to an array of positions that will be subsequently used when rasterising the primitives for the graphics processing output.

Each screen space (X, Y) coordinate is typically represented within the graphics processing pipeline using a floating point representation such as a 32-bit (single precision) floating point representation.

The Applicant has now recognised that it is possible to represent a snapped vertex position (e.g. comprising two snapped screen space (X, Y) coordinates) using less bits than are available in the representation(s) that is normally used to represent a snapped vertex position (e.g. using less bits than are available in two floating point representations such as two 32-bit (single precision) floating point representations), without losing any information. This is because the array of vertex positions to which each vertex position is snapped (and the array of positions that will subsequently be used for rasterisation) has a precision that is less than the precision with which each pre-snapped vertex position (i.e. each post-transform vertex position) is produced, so that the snapping has the effect of reducing the precision of each vertex position (e.g. of each screen space (X, Y) coordinate).

In particular, the Applicant has found that where each screen space (X, Y) coordinate is represented using a 32-bit (single precision) floating point representation, the snapping reduces the precision of each screen space (X, Y) coordinate such that each snapped screen space (X, Y) coordinate can be accurately represented using only 31 bits of the 32 bits available in the 32-bit (single precision) floating point representation.

Various embodiment exploit this by firstly converting (e.g. re-encoding) each (first) representation of the position of the vertex into a second representation in which at least one bit is unused to (is not used to) represent the position of the vertex. For example, each of the two (first) (e.g. 32-bit) floating point representations (that respectively represent each snapped screen space (X, Y) coordinate) may be converted into a second (e.g. 32-bit) floating point representation in which one bit is unused to (is not used to) represent the screen space coordinate in question.

Then, the at least one bit is used to represent the shading rate for the vertex, e.g. by modifying the at least one bit to represent (to encode) the shading rate for the vertex. For example, and in embodiments, each unused bit from each of the second (e.g. 32-bit) floating point representations (e.g. a total of two bits) is used (is modified) to represent the shading rate for the vertex.

In other words, each 32-bit (single precision) floating point representation of each snapped screen space (X, Y) coordinate is re-encoded to free up one bit within that representation, thereby providing two free bits in total, and the two free bits are used (are modified) to represent the shading rate for the vertex.

This has the effect of forming one or more representations, e.g. two 32-bit (single precision) floating point representations, that each represent both the position of the vertex and the shading rate for the vertex.

Each of the so-formed representation(s) of both the position of the vertex and the shading rate for the vertex may then be (and in embodiments are) stored in a (vertex attribute buffer in) memory such as a cache (e.g. an L2 cache of the graphics processor and/or a main memory of the graphics processing system), e.g. for later use by the graphics processor (e.g. by a renderer of the graphics processing pipeline being executed by the graphics processor).

This means that both the position of the vertex and its shading rate is stored in the memory in a manner that uses less memory bandwidth than would otherwise be the case. For example, instead of storing three (e.g. 32-bit floating point) representations (e.g. two for each of the screen space (X, Y) coordinates and one for the shading rate), only two (e.g. 32-bit floating point) representations are stored.

The overall effect of this is that the bandwidth and power requirements of the graphics processor and the graphics processing system are beneficially reduced. Embodiments accordingly provide an efficient technique for handling per-vertex shading rate(s).

It will be appreciated, therefore, that various embodiments provide an improved graphics processor, and an improved graphics processing system.

The graphics processor can be implemented as desired. The graphics processor may be part of an overall graphics processing system that includes a host processor that executes applications that can require graphics processing by the graphics processing pipeline of the graphics processor.

The graphics processing pipeline may comprise any suitable graphics processing pipeline such as a tile-based graphics processing pipeline. The graphics processing pipeline may in general comprise a vertex shading pipeline, followed by a fragment shading pipeline.

The vertex shading pipeline may be configured to receive (e.g. from the host processor) attributes of a plurality of vertices (which may be defined for a given graphics processing output, e.g. draw call), and to subject them to vertex shading operations that may operate to transform the attributes for each vertex into a desired form for the fragment shading pipeline.

This may comprise, in particular, (a geometry transformation stage of the vertex shading pipeline) transforming the originally defined vertex position attributes from the world or user space that they are initially defined for (e.g. as received from the host processor) to the screen space that the output of the graphics processing system is to be displayed in.

The vertex shading operations performed by the vertex shading pipeline may generate a set of output vertex attributes (i.e. appropriately "shaded" attributes) for use in the fragment shading pipeline.

The fragment shading pipeline may be configured to use the vertex shaded attributes to generate and define a plurality of primitives for processing, and to subject the primitives to processing in order, e.g., to display the frame.

To do this, the fragment shading pipeline may be configured to perform rasterisation, e.g. by determining which sampling points of an array of sampling points covering the output area to be processed are covered by a primitive, and rendering, e.g. by determining the appearance each sampling point should have (e.g. in terms of its colour, etc.) to represent the primitive at that sampling point.

The rasterising process may determine the sampling points that should be used for a primitive (i.e. the (X, Y) (screen space) positions of the sample points to be used to represent the primitive in the render output, e.g. frame to be displayed), e.g. using the screen space (X, Y) positions of the vertices of a primitive.

The rendering process may then derive the data, such as red, green and blue (RGB) colour values and an "Alpha" (transparency) value, necessary to represent the primitive at the sample points (i.e. "shades" each sample point). This can involve applying textures, blending sample point data values, etc.

Thus, the (fragment shading pipeline of the) graphics processing pipeline may include a plurality of processing stages including at least a rasteriser that rasterises input primitives to generate graphic fragments to be processed, and a renderer that processes fragments generated by the rasteriser to generate output fragment data.

In various embodiments, information representing a vertex of a plurality of vertices that define one or more primitives to be rendered by the graphics processing pipeline (e.g. vertex attribute information) is provided. This information may be provided within the vertex shading pipeline, for example after the geometry transformation stage has transformed the originally defined vertex attributes from the world space to the screen space (but before the information is stored for later use by the fragment shading pipeline).

Thus, the information may comprise post-transform vertex attribute information. The information may be provided by (generated by) an execution engine (of or executing the vertex shading pipeline) of the graphics processor. The information may be provided to a store converter unit of the graphics processor.

The vertex for which the information is provided comprises a vertex of a set of plural vertices, where the set of plural vertices together define one or more primitives that are to be rendered by the graphics processing pipeline. Thus, the vertex will itself define at least one primitive of the set of one or more primitives that are to be rendered by the graphics processing pipeline.

The information comprises at least a position of the vertex and a shading rate for the vertex. The information may also include any one or more other (post-transform) vertex attributes as appropriate, such as for example, colour, texture and so on. Such vertex attribute information may be provided in respect of each vertex of the set of vertices. Thus, the information may form part of a set of information that represents each vertex of the plurality of vertices.

Where the information comprises post-transform vertex attribute information, the position of the (each) vertex may comprise a screen space position of the (each) vertex. Thus, the position of the (each) vertex may include (at least) a position in a first (X) screen space dimension, and a position in a second orthogonal (Y) screen space dimension. That is, the (each) position may comprise two screen space (X, Y) coordinates.

At this stage, the (each) vertex position may be represented within the graphics processing pipeline using one or more (e.g. two) floating point representations. For example, each screen space (X, Y) coordinate may be represented using a floating point representation such as a 32-bit (single precision) floating point representation.

Each floating point representation may include at least an exponent and a mantissa, optionally together with a sign.

Each of the exponent and the mantissa may respectively be represented by a binary number which may comprise plural bits, while the optional sign may be represented by a single bit (i.e. a sign bit). Other arrangements would, of course, be possible.

Each floating point representation may have any suitable precision (number of bits), such as for example 16-bit (half), 32-bit (single), 64-bit (double), or 128-bit (quad) precision. In various particular embodiments, each floating point representation comprises a 32-bit (single precision) floating point representation.

Each floating point representation may be in accordance with the IEEE 754 Standard.

In various embodiments, the position of the vertex is snapped to an array of vertex positions so as to produce one or more first representations of the position of the vertex. Each vertex of the plurality of vertices may be snapped to the array of vertex positions in this manner.

Snapping the (each) position of the vertex to the array of vertex positions may comprise determining a position of the array of positions that is closest to the (pre-snapped) vertex position, and using the so-determined array position in place of the (original, pre-snapped) vertex position. Where the (each) position comprises two screen space (X, Y) coordinates, snapping the position of the (each) vertex to the array of vertex positions may comprise snapping each screen space (X, Y) coordinate, e.g. each post-transform screen space coordinate, to the array of vertex positions.

The array of vertex positions (grid) that is used for the snapping may comprise a regular array of vertex positions. The array may comprise a screen space array of vertex positions (a screen space grid). The array may correspond to an array of positions that will be subsequently used when rasterising the primitives for the graphics processing output.

The array may have a precision that is less than the precision with which each (pre-snapped) vertex position (i.e. each post-transform vertex position) is produced. In particular, the array may have a vertex position spacing of $1/256$ of a pixel (e.g. where the rasterisation uses a 16.8 fixed point coordinate representation).

This means that the snapping will have the effect of reducing the precision of each vertex position (e.g. of each screen space (X, Y) coordinate). As such, the one or more first representations may each comprise a representation of an approximation of the (pre-snapped, post-transform) vertex position, that is, a snapped (post-transform) vertex position.

In embodiments, the one or more first representations of the position of the vertex (that are produced by the snapping) comprise two representations, namely a representation of each of the two (snapped) screen space coordinates (X, Y). Each first representation may again comprise a floating point representation, such as a 32-bit (single precision) floating point representation (as described above).

Thus, in embodiments, the one or more first representations of the vertex position comprise two floating point representations, i.e. a first floating point representation of the first (snapped) screen space coordinate (X) and a second floating point representation of the second orthogonal (snapped) screen space coordinate (Y).

Where plural vertices are snapped to the array of vertex positions (such as where each vertex of the plurality of vertices is snapped to the array of vertex positions), one or more first representations (such as two first representations) may be produced in respect of each vertex position in a corresponding manner.

Any suitable part of the graphics processor and/or graphics processing pipeline may be used to perform the snapping. In various embodiments, the store converter unit is configured to snap the (each) vertex position to the array.

In various embodiments, each of one or more of the one or more first representations of the position of the vertex (such as each of the one or more first representations) is converted into a second representation of the position of the vertex, wherein at least one bit of the (each) second representation of the position of the vertex is unused to represent the position of the vertex.

Where the (each) position is represented using two floating point representations (with each representation representing one of two screen space coordinates), this may comprise converting each of the two representations of the position of the vertex into a respective second representation (so as to produce two second representations). In other words, the converting may comprise converting the first (floating point) representation of the first (snapped) screen space coordinate (X) into a second (floating point) representation of the first (snapped) screen space coordinate (X), and converting the first (floating point) representation of the second (snapped) screen space coordinate (Y) into a second (floating point) representation of the second (snapped) screen space coordinate (Y).

Each second representation may again comprise a floating point representation, such as a 32-bit (single precision) floating point representation (as described above). In embodiments, for each vertex position there are two such second floating point representations, i.e. a floating point representation of the first (snapped) screen space coordinate (X) and a floating point representation of the second orthogonal (snapped) screen space coordinate (Y).

At least one bit of each second representation may be unused to represent the position of the vertex. Thus, at least one bit of the (each) second (floating point) representation of the (each) first (snapped) screen space coordinate (X) may be unused to represent the (each) first (snapped) screen space coordinate (X), and at least one bit of the (each) second (floating point) representation of the (each) second (snapped) screen space coordinate (Y) may be unused to represent the (each) second (snapped) screen space coordinate (Y).

As described above, the Applicant has recognised that it is possible to represent a snapped vertex position (e.g. comprising two snapped screen space (X, Y) coordinates) using less bits than are available in the representation(s) that is normally used to represent a snapped vertex position (e.g. using less bits than are available in two floating point representations such as two 32-bit (single precision) floating point representations), without losing any information. This is because the array of vertex positions to which each vertex position is snapped (and the array of positions that will subsequently be used for rasterisation) has a precision that is less than the precision with which each pre-snapped vertex position (i.e. each post-transform vertex position) is produced, so that the snapping has the effect of reducing the precision of each vertex position (e.g. of each screen space (X, Y) coordinate).

In particular, it has been found that where each screen space (X, Y) coordinate is represented using a 32-bit (single precision) floating point representation, the snapping reduces the precision of each screen space (X, Y) coordinate such that each snapped screen space (X, Y) coordinate can be accurately represented using only 31 bits of the 32 bits available in the 32-bit (single precision) floating point representation.

Thus, in embodiments, the first (floating point) representation of the first (snapped) screen space coordinate (X) is converted into a second (floating point) representation of the first (snapped) screen space coordinate (X) in which one bit of the representation is unused to represent the first (snapped) screen space coordinate (X), and the first (floating point) representation of the second (snapped) screen space coordinate (Y) is converted into a second (floating point) representation of the second (snapped) screen space coordinate (Y) in which one bit of the representation is unused to represent the second (snapped) screen space coordinate (Y). In other words, each 32-bit (single precision) floating point representation of each snapped screen space (X, Y) coordinate is re-encoded to free up one bit within that representation, thereby providing two free bits in total.

Each first representation may be converted into a second representation using any suitable method that has the effect of "packing" each first representation into fewer bits.

In various embodiments, the conversion is done such that the at least one bit (the bit) that is unused comprises a specific, selected, bit of the (each) second representation. In other words, the converting may comprise converting each first representation into a second representation in which a specific, selected, bit of the second representation is unused to represent the position of the vertex. This facilitates relatively straightforward use and modification of the unused bit (as described further below).

The specific, selected, unused bit may be a specific, selected, bit of the exponent of the (each) floating point representation. The specific, selected, unused bit may appear at a specific, selected, bit position in the (exponent of the) (each) floating point representation. It will be appreciated in this regard, that the effect of the snapping is that very small values (in the range $0<x<1/256$) are not valid, and so very small exponents are not valid. Hence, the range of exponents is effectively reduced, such that the exponent can be expressed in 7 bits instead of 8.

In various particular embodiments, in order to convert the (each) first representation into a second representation, the (each) first representation is subjected to a so-called "load exponent" or "ldexp" operation. This represents a particularly efficient and convenient technique for converting each first representation into a second representation in which at least one bit is unused.

The load exponent operation is a standard operation which is defined for IEEE 754 floating point values. Its function is to multiply an input value by two to the power of the new exponent, i.e.:

$$ldexp(x, exp) = x * 2^{exp}.$$

In embodiments, this operation is used to shift each first floating point representation so as to produce a second floating point representation which has a lower exponent, without shifting out any non-zero mantissa bits. This is possible due to the nature of the snapping (as described above).

For example, where as described above, the array of vertex positions has a vertex position spacing of $1/256$ of a pixel, the smallest possible non-zero position is $1/256$. By multiplying this value by $2^{-141}$ (i.e. by performing ldexp ($1/256, -141$), this smallest possible position is mapped to the smallest expressible floating point value, namely the smallest expressible denormal value.

Correspondingly, subjecting each first representation to a load exponent (ldexp) operation, such as in particular a ldexp(x, −141) operation, has the effect of re-mapping each position to a representation in which one particular, selected bit of the representation is freed up, in a lossless manner. In particular, in these embodiments, the $30^{th}$ bit of the (each) (second) floating point representation is free up (is unused).

It will accordingly be appreciated that in embodiments, the converting has the effect of freeing up two bits in respect of the (each) vertex position, where each freed up (unused) bit appears at a particular, selected, bit position in the (exponent of the) (each) floating point representation.

Any suitable part of the graphics processor and/or graphics processing pipeline may be used to perform the converting. In various embodiments, the store converter unit configured to convert each first representation into a second representation.

Once the (each) first representation has been converted into a second representation, the at least one bit (e.g. the one unused bit of each representation) is used to represent the shading rate for that vertex. This may be done by modifying the at least one unused bit to represent (to encode) the shading rate for the vertex.

For example (and in embodiments), the two unused bits from each of the two second (32-bit floating point) representations are used (are modified) to represent the shading rate for that vertex. In other words, the unused bit of the second (floating point) representation of the first (snapped) screen space coordinate (X), and the unused bit of the second (floating point) representation of the second (snapped) screen space coordinate (Y) are together used to represent the shading rate for the vertex.

The shading rate for the (each) vertex can be represented using the at least one bit in any suitable manner. In embodiments, there is a set of plural possible shading rates that can be represented using the at least one bit, and each possible shading rate is represented using a (different) value of the at least one bit, e.g. in the manner of an enumerated type (enum).

For example, where one bit is used to represent the shading rate, the one bit may be used to indicate each of two possible shading rates. In various particular embodiments, where (as described above) two bits are used to represent the per-vertex shading rate, each possible (different) value of the two bits is used to indicate a different shading rate of each of four possible shading rates.

The set of plural possible shading rates that can be represented using the at least one bit may be selected as desired.

As described further below, the overall graphics processing system may support a set of shading rates (which may be different to the set of shading rates that can be represented using the at least one bit). For example, in embodiments, the set of plural possible shading rates supported by the system may include 1×1, 1×2, 2×1, 2×2, 2×4, 4×2 and 4×4 shading rates. (Other shading rates would be possible.)

Where the overall graphics processing system supports more shading rates than can be represented using the at least one bit (e.g., using two bits), then the set of possible shading rates that can be represented using the at least one bit may comprise a sub-set of the set of possible shading rates supported by the overall graphics processing system. In these embodiments, the sub-set may include the finest shading rates of the overall set, as these may be the most commonly used shading rates.

In various particular embodiments, where the set of plural possible shading rates that can be represented using the at least one bit includes four shading rates (as described above), the set of plural possible shading rates that can be represented using the at least one bit may include 1×1, 1×2, 2×1 and 2×2 shading rates.

Other arrangements would, however, be possible.

It will be appreciated that using the at least one bit of the second representation of the position of the vertex to represent the shading rate for the vertex has the effect of forming one or more representations of both the position of the vertex and the shading rate for the vertex. In embodiments, two (floating point) representations are produced (for the (each) vertex position), with each representation representing both the position of the vertex and the shading rate for the vertex, e.g. where one representation comprises a (e.g. 32-bit (single precision)) floating point representation that represents the first (X) (snapped) screen space coordinate and that partially represents the shading rate, and the other representation comprises a (e.g. 32-bit (single precision)) floating point representation that represents the second (Y) (snapped) screen space coordinate and that partially represents the shading rate.

Similar representation(s) can be (and in embodiments are) produced for each vertex of the set of vertices.

Any suitable part of the graphics processor and/or graphics processing pipeline may be used to perform this encoding. In various embodiments, the store converter unit is configured to use the at least one bit of the second representation of the position of the vertex to represent (to encode) the shading rate for the vertex, so as to form the representation of both the position of the vertex and the shading rate for the vertex.

Each of the so-formed representation(s) of both the position of the vertex and the shading rate for the vertex are then stored, e.g. in (a vertex attribute buffer in) memory, for later use by the graphics processor (e.g. by a renderer of the graphics processing pipeline).

The memory in which the (each) representations is stored may be any suitable memory such as an L2 cache of the graphics processor and/or a main memory of the graphics processing system.

This means that both the position of the vertex and its shading rate is stored in the memory in a manner that uses less memory bandwidth than would otherwise be the case. For example, instead of storing three (e.g. 32-bit floating point) representations (e.g. two for each of the screen space (X, Y) coordinates and one for the shading rate), only two (e.g. 32-bit floating point) representations are stored.

The overall effect of this is that the bandwidth and power requirements of the graphics processor and the graphics processing system are beneficially reduced. Embodiments accordingly provide an efficient technique for handling per-vertex shading rate(s).

It should be noted here that the combined vertex position and shading rate need not necessarily be stored in memory using the same, e.g. floating point, representation in which it was formed. For example, the vertex position and shading rate may be stored in memory using any suitable other representation such as, for example, an unsigned normalized integer representation of both the position of the vertex and the shading rate for the vertex.

Any suitable part of the graphics processor and/or graphics processing pipeline may be used to perform the storing. In various embodiments, a load store unit of the graphics processor and/or graphics processing pipeline may be configured to store the representation of both the position of the vertex and the shading rate for the vertex.

Once the representation(s) of both the position of the vertex and the shading rate for the vertex has been stored in this manner, each stored representation may then be used by the graphics processor and/or the graphics processing pipeline in any suitable manner.

To do this, the graphics processor may initially read the stored representation(s), e.g. from the memory in which it was stored, e.g. when needed. Any suitable part of the graphics processor and/or graphics processing pipeline may be used to perform the reading. In various embodiments, the load store unit is configured to read the stored representation of both the position of the vertex and the shading rate for the vertex.

Thus, various embodiments comprise reading the stored representation of both the position of the vertex and the shading rate for the vertex. This means that both the position of the vertex and its shading rate is read from the memory in a manner that uses less memory bandwidth than would otherwise be the case. For example, instead of reading three (e.g. 32-bit floating point) representations (e.g. two for each of the screen space (X, Y) coordinates and one for the shading rate), only two (e.g. 32-bit floating point) representations are read.

In this regard, the Applicant has furthermore recognised that the per-vertex shading rate is typically used at the same time as the vertex position, so that the read operation(s) that would in any event be used to read the vertex position information can be (and in embodiments are) also used to read the per-vertex shading rate, such that the total number of read operations required to perform variable rate shading is reduced.

The overall effect of this is that the bandwidth and power requirements of the graphics processor and the graphics processing system are beneficially reduced.

Once the (each) stored representation of both the position of the vertex and the shading rate for the vertex has been read, the read representation may then be decoded, e.g. so as to determine the shading rate and/or the position (e.g. coordinate) from the read representation. This may comprise determining the shading rate from the read representation, and then determining the position of the vertex.

In these embodiments, the shading rate may be determined from the read representation by firstly determining the value of the at least one bit (that was used to represent the shading rate). This may comprise, in respect of each vertex, determining the value of the (particular, selected) bit (that was used to represent the shading rate) of each of the two (floating point) representations of both the position of the vertex and the shading rate for the vertex, and combining the two values to provide an indication of the shading rate for that vertex.

For example, where, as described above, the 30th bit of each of the two representations is used to represent the shading rate, the shading rate may be determined (extracted) from the two representations by determining the value of the 30th bit of each of the two representations, and combining the two values to provide an indication of the shading rate for that vertex.

The so-provided indication may then be used to determine a shading rate for the vertex, e.g. by determining which shading rate of the set of possible shading rates is indicated by the indication.

In embodiments, determining the position of the vertex may initially comprise setting the at least one bit to zero, e.g. so as to recover the second representation of the position of the vertex, e.g. the second (floating point) representation of the first (snapped) screen space coordinate (X) and the second (floating point) representation of the second (snapped) screen space coordinate (Y).

The first representation of the position of the vertex, e.g. the first (floating point) representation of the first (snapped) screen space coordinate (X) and the first (floating point)

representation of the second (snapped) screen space coordinate (Y), may then be recovered from the second representation, e.g. by converting each second representation (back) into a first representation. This conversion may be done by subjecting each recovered second representation to an operation that is the inverse of the operation that was used to convert each first representation into a second representation (as described above). For example, an ldexp operation, such as an ldexp(x, 141) operation, may be used.

Once the position and/or shading rate have been determined in the above manner, each of the position and/or shading rate may then be used as desired. For example, the position and/or shading rate may be provided to and used by one or more stages of the graphics processing pipeline as appropriate, e.g. when rendering the one or more primitives to produce a render output. The per-vertex shading rate may be used to determine a shading rate to be used when rendering a primitive defined by the vertex.

Thus, the method may comprise:

reading the stored representation of both the position of the vertex and the shading rate for the vertex;

determining the shading rate for the vertex and/or the position of the vertex from the read representation of both the position of the vertex and the shading rate for the vertex;

determining, using the determined shading rate for the vertex, a shading rate to be used when rendering a primitive defined by the vertex; and rendering the primitive using the determined shading rate.

Correspondingly, the graphics processor may further comprise:

read circuitry configured to read the stored representation of both the position of the vertex and the shading rate for the vertex;

decoding circuitry configured to determine the shading rate for the vertex and/or the position of the vertex from the read representation of both the position of the vertex and the shading rate for the vertex;

rate combiner circuitry configured to determine, using the determined shading rate for the vertex, a shading rate to be used when rendering a primitive defined by the vertex; and a renderer configured to render the primitive using the determined shading rate to generate a render output.

Thus, in embodiments, the graphics processor is configured to generate a render output. Correspondingly, the method may comprise a renderer generating a render output by rendering the primitive. One or more other primitives may be, and in embodiments are, rendered by the renderer in order to generate the render output. In this case, each other primitive may also rendered in the manner of various embodiment.

The render output may comprise any suitable render output, such as frame for display, or render to texture output, etc. In an embodiment, the render output is an output frame in a sequence of plural output frames that the graphics processor generates. In this case, each output frame may be generated in the manner of various embodiments.

The render output will typically comprise an array of data elements (sampling points) (e.g. pixels), for each of which appropriate render output data (e.g. a set of colour value data) is generated. The data may comprise, for example, a set of red, green and blue, RGB values and a transparency (alpha, a) value.

The render output may be generated for display on a display device having a display or output comprising a plurality of pixels, such as a computer monitor or a printer. The render output may accordingly include, for each output pixel of the display device, a set of one or more corresponding data elements (sampling points). Each such set of data elements (sampling points) may include only a single data element (sampling point). Alternatively, each set of data elements may include plural data elements (sampling points). In this latter case, each sampling point may effectively correspond to a part of a pixel (e.g. a sub-pixel) of the display device, and the render output may be subjected to an appropriate downsampling operation to generate the output pixel values for displaying the final image on the display device.

The render output should be, and in embodiments is, generated by the renderer using one or more of plural possible different shading rates. As described above, there may be a set of plural possible shading rates that the graphics processing system supports and can use. Accordingly, determining a shading rate may comprise selecting a shading rate from the set of plural possible shading rates.

Correspondingly, there should be, and in embodiments is, a set of plural possible different sized render output areas for which a single set of colour value data (a single colour) can be sampled (rendered) by the renderer. Accordingly, the method may comprise the renderer rendering the primitive by sampling one or more sets of colour value data (colours) for the primitive, and applying each sampled set of colour value data (colour) to an area of the render output having a size in accordance with the determined shading rate.

The smallest render output area in the set of plural possible render output areas may be referred to as a "fine pixel", and the other, larger render output areas may be referred to as "coarse pixels". Each "fine pixel" may be the same size and location as a pixel of the output display device. Alternatively, each "fine pixel" may correspond to less than one pixel of the output display device, for example where downsampling is to be applied.

The area of each possible "coarse pixel" may correspond to a block of plural "fine pixels".

The different possible shading rates may be referred to in terms of the number of fine pixels that the shading rate corresponds to. For example, a 1×1 shading rate may signify the finest possible shading mode in which a single set of colour value data is sampled for an area of the render output corresponding to a single fine pixel, whereas a 2×2 shading rate may signify that a single set of colour value data is sampled for an area of the render output corresponding to a block of 2×2 fine pixels.

The set of plural possible shading rates that may be supported by the graphics processing system can include any suitable shading rates. (As described above, the set of plural possible shading rates that are supported by the graphics processing system may be different to the set of possible shading rates that may be indicated using the technology described herein.) In embodiments, the set of plural possible shading rates supported by the system includes 1×1, 1×2, 2×1, 2×2, 2×4, 4×2 and 4×4 shading rates. Other shading rates would be possible.

In embodiments, the graphics processing pipeline comprises a rasteriser configured to rasterise primitives to generate fragments; and a renderer that is operable to render primitives by rendering fragments generated by the rasteriser; and the method comprises the rasteriser rasterising the primitive to generate a fragment. The renderer may render the primitive by rendering the fragment using the determined shading rate.

The rasteriser will generate graphics fragments to be rendered to generate render output data for sampling points of the render output. Each fragment that is generated by the rasteriser should, and in embodiments does, have associated with it a set of sampling points of the render output and may be used to generate render output data for one or more of the sampling points of the set of sampling points associated with the fragment.

The sets of sampling points that are associated with each fragment can be selected as desired. Each set of sampling points (and accordingly each sampling point) will represent a (screen space) location (x, y position) in the render output, e.g., frame to be displayed. The pattern and (relative) positions of the sample points in each set of sampling points (the sampling pattern) can also be selected as desired.

Where the render output is to be displayed on a display device having a display or output comprising a plurality of pixels, each set of sampling points that a fragment may be associated with may correspond to a set of sampling points for a given pixel (pixel location) of the output device (e.g., display or printer), or to a set of sampling points for a part of a pixel (e.g. a sub-pixel) of the output device. In the latter arrangement, a group of plural of the sets of sampling points may make up an overall set of sampling points for a pixel of the display. In these arrangements, each fragment may effectively render fragment data for a given pixel of the display device (e.g., display or printer).

As described above, in embodiments, a shading rate to be used when rendering the primitive is determined based on the per-vertex shading rate. The shading rate can be determined based on the per-vertex shading rate in any suitable manner.

The shading rate may be determined based on only the per-vertex shading rate, or based on the per-vertex shading rate and one or more other factors. For example, and in an embodiment, a shading rate to use to render a primitive may be determined based on a the per-vertex shading rate and one or both of: a drawcall that the primitive belongs to, and a region of the render output within which the primitive falls within.

Where a shading rate is to be determined based on two or more different factors, it is possible that the determination will result in two or more corresponding competing shading rates. In this case, the competing shading rates may be combined in any suitable manner. In embodiments, competing shading rates are combined into a single shading rate using a combining function. The combining function may specify, for example, that competing shading rates should be combined by using the finest or coarsest shading rate, or by determining and using an average shading rate.

In embodiments, the shading rate is determined in accordance with instructions that may be specified by an application that the render output is being generated for. Thus, the method may comprise the graphics processor receiving instructions, e.g. from an (the) application, and determining the shading rate to use in accordance with the instructions. The instructions may specify the factors that should be used to determine shading rate, and/or a combining function to be used to combine any competing shading rates.

Once a shading rate has been determined, that shading rate is used when rendering the primitive. This should, and in embodiments does, have the effect that a greater number of colours are sampled by the renderer when a finer shading rate is determined, as compared to when a coarser shading rate is determined. This can be achieved in any suitable manner.

For example, the rasteriser could rasterise primitives into fragments based on the determined shading rate, such that the area of the render output that a fragment generated by the rasteriser corresponds to varies according to determined shading rate. Thus, in an embodiment, the method comprises the rasteriser rasterising the primitive according to the determined shading rate. For example, the rasteriser could generate fragments that correspond to larger areas of the render output when a coarser shading rate is determined, and generate fragments that corresponds to smaller areas of the render output when a finer shading rate is determined. The renderer may then sample a single set of colour value data (a single colour) for each so-generated fragment. This will then have the effect that a greater number of fragments are generated, and so colours are sampled, when a finer shading rate is determined, as compared to when a coarser shading rate is determined.

In embodiments, the rasteriser is operable to generate fragments in the "normal" manner. That is, in embodiments, the rasteriser operates to generate fragments that each correspond to the same sized area of the render output, e.g. corresponding to one pixel or sub-pixel (a "fine pixel"). Fragments generated in this way are then, in effect, "combined" according to the determined shading rate into sets of one or more fragments, and a single set of colour value data (a single colour) is sampled for each such set of one or more fragments. For example, and in an embodiment, a greater number of fragments are included in a set of fragments when a coarser shading rate is determined, as compared to when a finer shading rate is determined. This will then have the effect that a greater number of colours are sampled when a finer shading rate is determined, as compared to when a coarser shading rate is determined.

This "combining" of fragments can be achieved in any suitable manner.

In embodiments, the renderer comprises a programmable processing stage (shader) that is operable to generate render output data by execution threads executing (shader) program instructions. A single set of colour value data may be generated (a single colour may be sampled) by each execution thread executing the (shader) program. In this case, fragments are, in effect, "combined" by issuing (only) one execution thread to the programmable processing stage (shader) for each set of one or more fragments. This then has the effect that the programmable processing stage (shader) executes the (shader) program (only) once for each set of one or more fragments, such that (only) a single set of colour value data is sampled for each set of "combined" fragments.

In embodiments, execution threads are grouped into "groups" or "bundles" of threads, where the threads of one group are run in lockstep, one instruction at a time. This can improve shader program execution efficiency, because it is possible to share instruction fetch and scheduling resources between all the threads in the group. Other terms used for such thread groups include "warps" and "wave fronts". For convenience, the term "thread group" will be used herein, but this is intended to encompass all equivalent terms and arrangements, unless otherwise indicated.

In this case, in embodiments, the "combining" of fragments occurs when determining thread groups to be executed by the programmable processing stage (shader). Thus, in embodiments, the renderer comprises a thread group generating stage operable to generate thread groups comprising execution threads for execution by the programmable processing stage (shader).

In this case, in embodiments, the renderer rendering the primitive using the determined shading rate comprises the thread group generating stage generating a thread group comprising execution threads for execution by the programmable processing stage (shader) based on the determined shading rate (and the programmable processing stage (shader) executing the execution threads in the thread group).

In embodiments, information indicating the shading rate to be used for each thread group is stored in storage by the thread group generating stage. This information may then be accessed by the programmable processing stage (shader) in order to determine the shading rate to use for each thread group.

Once a colour (set of colour value data) has been sampled by the renderer (executing the (shader) program), the colour should be, and in embodiments is, "broadcast" to each (e.g. covered) sampling point in the render output that the colour applies to. This should, and in embodiments does, have the effect that a single colour will be used for more sampling points in the render output when a coarser shading rate is used, as compared to when a finer shading rate is used.

In embodiments, render output data is "broadcast" to each corresponding sampling in an output buffer, e.g. tile buffer. This may comprise writing render output data produced by the renderer (directly) to the output buffer based on the determined shading rate. Alternatively, where blending is required, a blender stage of the graphics processing pipeline may appropriately blend render output data newly generated by the renderer with render output data already stored in the output buffer based on the determined shading rate.

Although as described above, in various particular embodiments, the at least one bit that is freed up is used to encode a shading rate, the Applicant has furthermore recognised that the at least one bit could be used to encode other information such as one or more other vertex attitudes.

Thus, a third embodiment of the technology described herein comprises a method of operating a graphics processor that is configured to execute a graphics processing pipeline, the method comprising:

providing information representing a vertex of a plurality of vertices that define one or more primitives to be rendered by the graphics processing pipeline, wherein the information comprises at least a position of the vertex and one or more other vertex attributes;

snapping the position of the vertex to an array of vertex positions so as to produce one or more first representations of the position of the vertex;

converting each of one or more of the one or more first representations of the position of the vertex into a second representation of the position of the vertex, wherein at least one bit of the second representation of the position of the vertex is unused to represent the position of the vertex;

using the at least one bit of the second representation of the position of the vertex to represent the one or more other vertex attributes, so as to form a representation of both the position of the vertex and the one or more other vertex attributes; and storing a representation of both the position of the vertex and the one or more other vertex attributes.

A fourth embodiment of the technology described herein comprises a graphics processor configured to execute a graphics processing pipeline, the graphics processor comprising:

processing circuitry configured to receive information representing a vertex of a plurality of vertices that define one or more primitives to be rendered by the graphics processing pipeline, wherein the information comprises at least a position of the vertex and one or more other vertex attributes;

processing circuitry configured to snap the position of the vertex to an array of vertex positions so as to produce one or more first representations of the position of the vertex;

processing circuitry configured to convert each of one or more of the one or more first representations of the position of the vertex into a second representation of the position of the vertex, wherein at least one bit of the second representation of the position of the vertex is unused to represent the position of the vertex;

processing circuitry configured to use the at least one bit of the second representation of the position of the vertex to represent the one or more other vertex attributes, so as to form a representation of both the position of the vertex and the one or more other vertex attributes; and storing circuitry configured to store a representation of both the position of the vertex and the one or more other vertex attributes.

These embodiments can, an in embodiments do, include any one or more or each of the optional features described herein.

The one or more other vertex attributes may comprise a shading rate for the vertex (as described above).

The graphics processor can execute any suitable and desired graphics processing pipeline, and may and in an embodiment does, include any suitable and desired processing circuits, processing logic, components and elements for that purpose.

The graphics processor and graphics processing pipeline may be, and in an embodiment are, a tile-based graphics processor and processing pipeline operable to generate tiles of an overall render output, e.g. frame.

The graphics processing pipeline that the graphics processor executes can include any suitable and desired processing stages for generating a (the) render output (e.g. frame). Thus, the graphics processing pipeline can include, and in an embodiment does include, in addition to the above described stages, any one or one or more, and in an embodiment all, of the other processing stages that graphics processing pipelines normally include. Thus, for example, the graphics processing pipeline in an embodiment also includes a vertex shading stage, a primitive setup stage, etc. Where the pipeline is a tile-based pipeline, the pipeline in an embodiment also comprises a tiling stage, and/or a write out unit that operates to write the data in the tile buffer (e.g. once the data in the tile buffer is complete) out to external (main) memory (e.g. to a frame buffer).

A (and each) processing stage (circuit) of the graphics processing pipeline (processor) can be implemented as desired, e.g. as a fixed function hardware unit (circuit) or as a programmable processing circuit (that is programmed to perform the desired operation).

As will be appreciated by those skilled in the art, the graphics processor of the technology described herein may be part of an overall graphics processing system that includes, e.g., and in an embodiment, a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and in an embodiment does, also execute a driver for the graphics processor and a compiler or compilers for compiling programs to be executed by the (programmable processing stage (shader) of the) graphics processor.

The graphics processor may also comprise, and/or be in communication with, one or more memories and/or memory devices that store the data described herein, and/or the output data generated by the graphics processor, and/or store software (e.g. (shader) program) for performing the processes described herein. The graphics processor may also be in communication with a host microprocessor, and/or with a display for displaying images based on the data generated by the graphics processor.

Embodiments can be used for all forms of output that a data processor (and processing pipeline) may be used to generate. For example, in the case of graphics processing, the graphics processing pipeline may generate frames for display, render to texture outputs, etc. The output data values from the processing are in an embodiment exported to external, e.g. main, memory, for storage and use, such as to a frame buffer for a display.

Embodiments are applicable to any suitable form or configuration of graphics processor and graphics processing system. It is particularly applicable to tile based graphics processors and graphics processing systems. Thus in an embodiment, the graphics processor is a tile-based graphics processor (and pipeline).

In an embodiment, the various functions of the technology described herein are carried out on a single graphics processing platform that generates and outputs data (such as rendered fragment data that is, e.g., written to the frame buffer), for example for a display device.

Embodiments can be implemented in any suitable system, such as a suitably configured micro-processor based system. In an embodiment, the technology described herein is implemented in a computer and/or micro-processor based system.

Embodiments may be implemented in a portable device, such as a mobile phone or tablet.

The various functions of embodiments can be carried out in any desired and suitable manner. For example, the functions of embodiments can be implemented in hardware or software, as desired. Thus, for example, the various functional elements, stages, and "means" of embodiments may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of embodiments may be duplicated and/or carried out in parallel on a given processor. Equally, the various processing stages may share processing circuitry, etc., if desired.

It will also be appreciated by those skilled in the art that all of the described embodiments can include, as appropriate, any one or more or all of the optional features described herein.

The methods in accordance with embodiments may be implemented at least partially using software e.g. computer programs. It will thus be seen that when viewed from further embodiments the technology described herein provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), etc.

Embodiments also extend to a computer software carrier comprising such software which when used to operate a graphics processor, renderer or other system comprising data processing means causes in conjunction with said data processing means said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of embodiments need be carried out by computer software and thus from a further broad embodiment the technology described herein provides computer software and such software installed on a computer software carrier for carrying out at least one of the steps of the methods set out herein.

Embodiments may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

Various embodiments of the technology described herein will now be described by way of example only and with reference to the accompanying drawings.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

Graphics processing is typically carried out in a pipelined fashion, with one or more pipeline stages operating on the data to generate the final render output, e.g. frame that is displayed.

FIG. 1 shows an exemplary graphics processing pipeline 10.

The graphics processing pipeline 10 shown in FIG. 1 is a tile based renderer and will thus produce tiles of a render output data array, such as an output frame to be generated.

FIG. 1 shows the main elements and pipeline stages of the graphics processing pipeline. As will be appreciated by those skilled in the art, there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuitry and/or processing logic, etc., for performing the necessary operation and functions.

The graphics processing pipeline 10 shown in FIG. 1 includes a number of stages, including vertex shader 200, a hull shader 201, a tesselator 202, a domain shader 203, a geometry shader 204, a tiler 205, a rasterisation stage 206, an early Z (depth) and stencil test stage 207, a renderer in the form of a fragment shading stage 208, a late Z (depth) and stencil test stage 209, a blending stage 210, a tile buffer 211 and a downsampling and writeout (multisample resolve) stage 212.

The vertex shader 200 takes the input data values (vertex attribute values) associated with the vertices, etc., defined for the output to be generated, and processes those data values to generate a set of corresponding "vertex shaded" output data values for use by subsequent stages of the graphics processing pipeline.

For a given output to be generated by the graphics processing pipeline, there will typically be a set of vertices defined for the output in question. The primitives to be processed for the output will then be indicated as comprising given vertices in the set of vertices for the graphics processing output being generated.

The vertex shading operation operates to transform the attributes for each vertex into a desired form for the subsequent graphics processing operations. This may comprise, in particular, transforming vertex position attribute values from the world or user space that they are initially defined for to the screen space that the output of the graphics processing system is to be displayed in, modifying the input data to take account of the effect of lighting in the image to be rendered, etc.

The vertex shading operation may also convert the originally defined vertex position coordinates to a different, e.g., lower precision, form to be used later on in the graphics processing pipeline.

The hull shader 201 performs operations on sets of patch control points and generates additional data known as patch constants. The tessellation stage 202 subdivides geometry to create higher order representations of the hull, and the domain shader 203 performs operations on vertices output by the tessellation stage (similar to a vertex shader). The geometry shader 204 may (if run) generate primitives such as a triangles, points or lines for processing.

Once all the primitives to be rendered have been appropriately processed, e.g. transformed, and/or, e.g., generated by the geometry shader, the tiler 105 then determines which primitives need to be processed for each tile that the render output has been divided into for processing purposes. To do this, the tiler 105 compares the location of each primitive to be processed with the tile positions, and adds the primitive to a respective primitive list for each tile that it determines the primitive could (potentially) fall within. Any suitable and desired technique for sorting and binning primitives into tile lists, such as exact binning, or bounding box binning or anything in between, can be used for the tiling process.

Once the tiler 205 has completed the preparation of the primitive tile lists (lists of primitives to be processed for each tile), then each tile can be rendered.

To do this, each tile is processed by the graphics processing pipeline stages shown in FIG. 1 that follow the tiler 205.

Thus, when a given tile is being processed, each primitive that is to be processed for that tile (that is listed in a tile list for that tile) is passed to the rasteriser 206.

The rasterisation stage 206 of the graphics processing pipeline 10 operates to rasterise the primitives into individual graphics fragments for processing.

To do this, the rasteriser 206, particularly a primitive set-up stage 81 (otherwise known as a triangle set-up unit ("TSU")) of the rasteriser 206, operates to determine, from the vertex shaded vertices provided to the primitive set-up stage 81, edge information representing each primitive edge of a primitive to be rasterised. This edge information is then passed to a rasterisation stage 82 of the rasteriser 206, which rasterises the primitive to sampling points and generates graphics fragments having appropriate positions (representing appropriate sampling positions) for rendering the primitive.

(It will be appreciated that although FIG. 1 shows the primitive set-up stage 81 being part of a single rasterisation unit (the rasteriser 206 of FIG. 1), this is not required. It is possible for the primitive set-up stage to be separate from the rasteriser 206, e.g. at a stage of the graphics processing pipeline that is (e.g. immediately) before the rasteriser 206, but after the tiler 205.)

The fragments generated by the rasteriser are then sent onwards to the rest of the pipeline for processing.

The early Z/stencil stage 207 performs a Z (depth) test on fragments it receives from the rasteriser 206, to see if any fragments can be discarded (culled) at this stage. To do this, it compares the depth values of (associated with) fragments issuing from the rasteriser 206 with the depth values of fragments that have already been rendered (these depth values are stored in a depth (Z) buffer that is part of the tile buffer 211) to determine whether the new fragments will be occluded by fragments that have already been rendered (or not). At the same time, an early stencil test is carried out.

Fragments that pass the fragment early Z and stencil test stage 207 are then sent to the fragment shading stage 208. The fragment shading stage 208 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 208 is in the form of a shader pipeline (a programmable fragment shader).

There is then a "late" fragment Z and stencil test stage 209, which carries out, inter alia, an end of pipeline depth test on the shaded fragments to determine whether a rendered fragment will actually be seen in the final image. This depth test uses the Z buffer value for the fragment's position stored in the Z-buffer in the tile buffer 211 to determine whether the fragment data for the new fragments should replace the fragment data of the fragments that have already been rendered, by comparing the depth values of (associated with) fragments issuing from the fragment shading stage 208 with the depth values of fragments that have already been rendered (as stored in the depth buffer). This late fragment depth and stencil test stage 209 also carries out any necessary "late" alpha and/or stencil tests on the fragments.

The fragments that pass the late fragment test stage 209 are then subjected to, if required, any necessary blending operations with fragments already stored in the tile buffer 211 in the blender 210. Any other remaining operations necessary on the fragments, such as dither, etc. (not shown) are also carried out at this stage.

Finally, the (blended) output fragment data (values) are written to the tile buffer 211 from where they can, for example, be output to a frame buffer 213 for display. The depth value for an output fragment is also written appropriately to a Z buffer within the tile buffer 211. (The tile buffer stores colour and depth buffers that store an appropriate colour, etc., or Z value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 211 is input to a downsampling (multisample resolve) write out unit 212, and thence output (written back) to an external memory output buffer, such as a frame buffer 213 of a display device (not shown). (The display device could comprise, e.g., a display comprising an array of pixels, such as a computer monitor or a printer.)

The downsampling and writeout unit 212 downsamples the fragment data stored in the tile buffer 211 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer 213 in a main memory) for storage, the next tile is then processed, and so on, until sufficient tiles have been processed to generate the entire render output (e.g. frame (image) to be displayed). The process is then repeated for the next render output (e.g. frame) and so on.

Other arrangements for a graphics processing pipeline would, of course, be possible.

The graphics processing pipeline as illustrated in FIG. 1 will be executed on and implemented by an appropriate graphics processing unit (GPU) (graphics processor) that includes the necessary functional units, processing circuitry, etc., operable to execute the graphics processing pipeline stages.

In order to control a graphics processor (graphics processing unit) that is implementing a graphics processing pipeline to perform the desired graphics processing pipeline operations, the graphics processor will typically receive commands and data from a driver, e.g. executing on the host processor, that indicates to the graphics processor the operations that it is to carry out and the data to be used for those operations.

Figure 2:
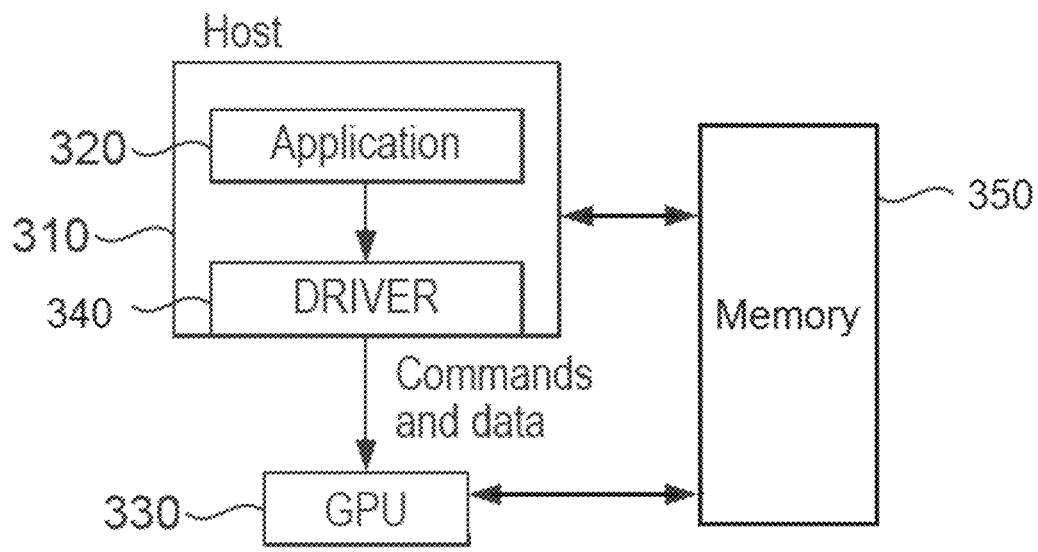
FIG. 2 shows schematically a graphics processing system in accordance with various embodiments.

Accordingly, as shown in FIG. 2 (which shows a typical computer graphics processing system), an application 320, such as a game, executing on a host processor 310 that requires graphics processing operations to be performed by an associated graphics processing unit (graphics processing pipeline) 330, will generate appropriate API (Application Programming Interface) calls that are interpreted by a driver 340 for the graphics processor 330 that is running on the host processor 310 to generate appropriate instructions to the graphics processor 330 to generate graphics output required by the application 320.

To facilitate this, a set of instructions will be provided to the graphics processor 330 in response to instructions from the application 320 running on the host system 310 for graphics output (e.g. to generate a frame to be displayed). The driver 340 may send commands and data to the graphics processor 330 by writing to memory 350.

Various embodiments relate in particular to so-called Variable Rate Shading (VRS).

As described above, the rendering process may typically produce a render output comprising an array of sampling points, for each of which appropriate data (e.g. a set of colour value data) is generated. For each output pixel, there is typically a set of one or more corresponding sampling points in the render output. Each such set of sampling points may include only one sampling point, or where downsampling is used, each set of sampling points may include plural sampling points.

Variable rate shading (VRS) is a technique that allows different shading rates to be used to render a render output, i.e. such that a single colour (set of colour value data) can be sampled (rendered) for one of plural possible different sized areas in a render output. For example, a single colour may be sampled for an area of the render output corresponding to only a single pixel, or a single colour may be sampled for an area of the render output corresponding to each pixel in a block of plural pixels.

Sampling (rendering) a single colour and applying it to plural sampling points (e.g. pixels) will reduce the processing effort required for those sampling points, as compared to sampling an individual colour for each sampling point, but will usually come at the expense of reduced image quality.

In Variable Rate Shading (VRS), there will typically be a set of plural possible shading rates that a graphics processor supports and is able to use. That is, there will typically be a set of plural possible different sized render output areas that a single colour (set of colour value data) can be sampled for. The smallest possible of these render output areas may be referred to as a "fine pixel", and the other, larger render output areas may be referred to as "coarse pixels".

Each "fine pixel" will typically be the same size and location as a pixel of the output display device. However, it is also possible for each "fine pixel" to effectively correspond to less than one pixel of the output display device, for example where downsampling is to be applied.

The area of each possible "coarse pixel" typically corresponds to a block of plural "fine pixels". The different possible shading rates are then referred to in terms of the number of fine pixels that the shading rate corresponds to. For example, a 1×1 shading rate will signify the finest possible shading mode in which a single colour should be sampled for a single fine pixel, whereas a 2×2 shading rate will signify that a single colour should be sampled for an area corresponding to a block of 2×2 fine pixels. A graphics processor may typically support 1×1, 1×2, 2×1, 2×2, 2×4, 4×2 and 4×4 shading rates, for example.

Figure 3:
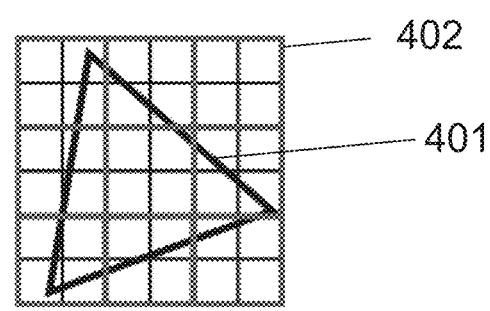
FIG. 3 illustrates a primitive that may be rendered using different shading rates in accordance with various embodiments.

FIG. 3 illustrates a comparison of an exemplary primitive 401 being rendered using 1×1 and 2×2 shading rates. FIG. 3 shows the location of the exemplary primitive 401 to be rendered relative to a 6×6 block of fine pixels 402. Each small square represents one of the fine pixels of the "variable rate shading" (VRS) process.

In the case of a 1×1 shading rate, the rendering process samples (renders) a single colour (set of colour value data) for each fine pixel that a primitive covers. In this case, the primitive 401 is visible in (covers) 23 out of the 36 illustrated fine pixels, and so the rendering process will sample a total of 23 colours (sets of colour value data).

Each larger square in FIG. 3 represents one 2×2 coarse pixel that is used in the 2×2 shading rate process. Each 2×2 coarse pixel encompasses a block of 2×2 fine pixels. In this case, the rendering process samples (renders) a single colour (set of colour value data) for each such coarse pixel that a primitive covers. In this case, the primitive 401 covers 8 out of the 9 illustrated 2×2 coarse pixels, and so the rendering process will sample only 8 colours (sets of colour values).

Thus, it will be appreciated that a coarser shading rate is associated with a lower density of rendered colours as compared to a finer shading rate. Moreover, it will be appreciated that rendering the primitive 401 using a coarser shading rate will reduce processing requirements, as compared to rendering the primitive 401 using a finer shading rate. However, this will typically come at the expense of reduced image quality.

Variable Rate Shading (VRS) allows the application 320 to select a shading rate, which means that groups of pixels (1×1, 1×2, 2×1, 2×2, 2×4, 4×2 or 4×4) are shaded once and the colour value is broadcast to all covered pixels in the "coarse pixel". This saves computational effort at the cost of some visual degradation. It is possible to only support the 1×1, 1×2, 2×1 and 2×2 shading rates. 4×2, 2×4 and 4×4 shading rates may be optional.

Referring again to FIG. 2, in the present embodiment, the commands and data provided to the graphics processor 330 may include information indicating a shading rate or rates that should be used by the graphics processor 330 when generating a render output. The application 320 may be able to specify shading rate based on the drawcall that the primitive belongs to, and/or a provoking vertex that the primitive is associated with, and/or the region of the render output within which the primitive appears. Thus, the application 320 may specify "per-drawcall" shading rates, and/or "per-primitive" shading rates, and/or "per-screen space" shading rates.

In the case that the application 320 specifies shading rates based on two or more different criteria, the application 320 may also specify how different competing shading rates should be combined. To do this, the application 320 specifies a set of combiner functions that should be used to combine competing shading rates. For example, the application 320 may specify that competing shading rates should be combined by using the finest or coarsest shading rate, or by determining an average shading rate.

Thus, the commands and data provided by the driver 340 will include commands to render primitives for the render output to be generated by the graphics processor 330, together with associated vertex data representing the vertices to be used for the primitives for the render output, and information indicating the shading rates specified by the application 320.

The commands sent to the graphics processor 330 cause the graphics processor 330 to read the vertex data from the memory 350, and process the read vertex data to generate the render output accordingly. The graphics processor 330 will typically use the vertex data for a primitive to rasterise the primitive to one or more fragments each (potentially) applying to a region (area) of the render output. The fragments may then be rendered.

The completed render output (e.g. frame) may be written in a frame buffer in the memory 350, from where it may be provided for display on a display device, such as a screen or printer.

Figure 4:
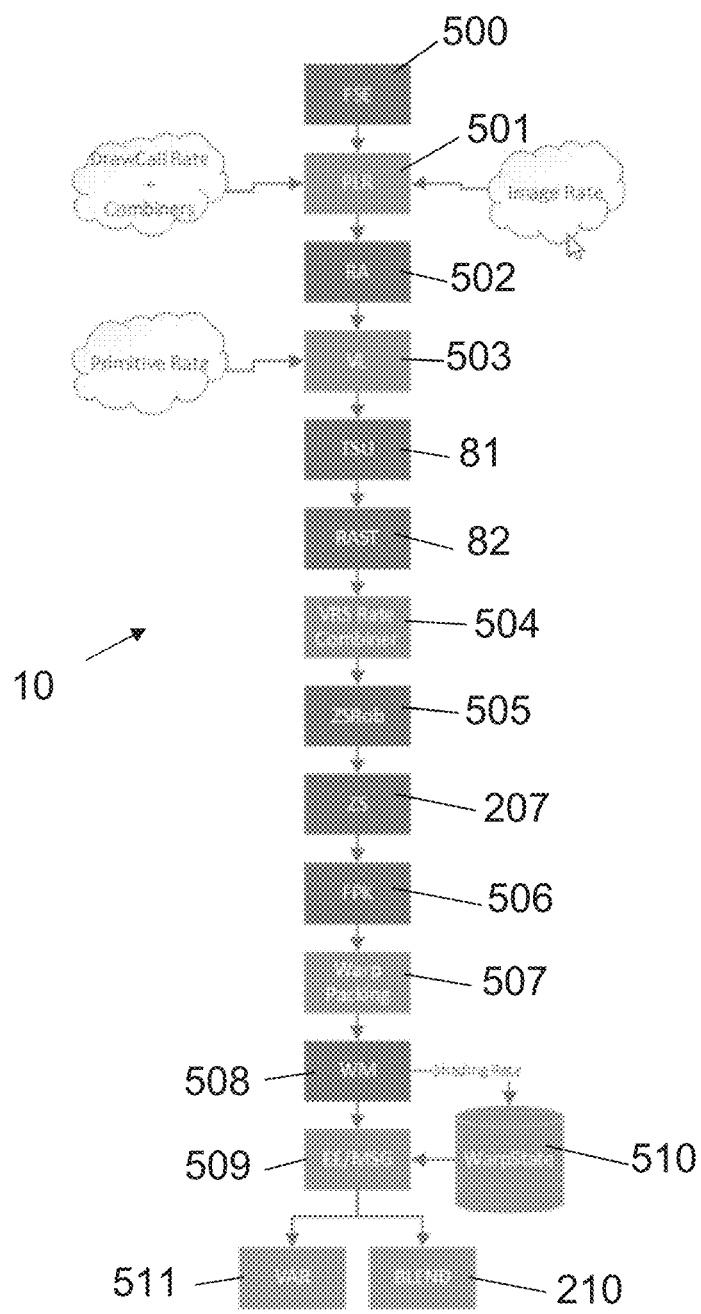
FIG. 4 shows schematically a graphics processing pipeline in accordance with various embodiments.

FIG. 4 shows in detail a part of the graphics processing pipeline 10 that may be executed by the graphics processor 330 in accordance with an embodiment. FIG. 4 shows the stages of the graphics processing pipeline 10 following the generation and storing of primitive lists and processed vertex data. These stages operate to generate each tile of the render output in turn using the primitive lists and processed vertex data stored in memory. Tiles generated in this manner are then combined to generate the entire render output.

As shown in FIG. 4, the graphics processing pipeline 10 includes a fragment shading endpoint ("FSE") 500, which schedules the rendering work that the graphics processing pipeline 10 needs to perform in order to generate a tile.

In response to the fragment shading endpoint ("FSE") 500 scheduling rendering work for a tile, a primitive list reader ("PLR") 501 reads the appropriate primitive list(s) for that tile from the memory 350 to identify the primitives that are to be rendered for the tile.

As shown in FIG. 4, the primitive list reader ("PLR") 501 also reads in the "per-drawcall" shading rate, "per-screen space" shading rate, and combiner function information from memory.

A resource allocator ("RA") 502 then configures the various elements of the GPU 330 for rendering the primitives that the primitive list reader ("PLR") 501 has identified are to be rendered for the tile. For example, the resource allocator ("RA") 502 appropriately configures the tile buffer for storing output data for the tile being rendered.

A vertex loader ("VL") 503 then reads the appropriate processed vertex data for primitives to be rendered from memory, and provides the primitives (i.e. their processed vertex data) to a triangle set-up unit ("TSU") 81.

As shown in FIG. 4, the vertex loader ("VL") 503 also reads in the "per-primitive" shading rate information from memory.

As described above, the triangle set-up unit ("TSU") 81 performs primitive setup operations to setup the primitives to be rendered. This includes determining, from the vertices for the primitives, edge information representing the primitive edges. The edge information for the primitives is then passed to the rasteriser 82.

When the rasteriser 82 receives a graphics primitive for rendering (i.e. including its edge information), it rasterises the primitive to sampling points and generates one or more graphics fragments having appropriate positions (representing appropriate sampling positions) for rendering the primitive.

A shading rate combiner stage 504 may then combine the "per-drawcall", and/or "per-primitive", and/or "per-screen space" shading rates using the combiner function information read from memory. This process results in an overall combined shading rate to be used for the fragment in question.

Fragments generated by the rasteriser 82 then pass to a Z depth and stencil test re-order buffer ("ZSRob") 505. The Z depth and stencil test re-order buffer ("ZSRob") 505 may operate to re-order fragments into an order that is suitable for subsequent processing by the Z depth and stencil test stage ("ZS") 207.

As described above, the Z depth and stencil test stage ("ZS") 207 performs a Z depth test on fragments it receives from the Z depth and stencil test re-order buffer ("ZSRob") 505, to see if any fragments can be discarded (culled) at this stage. Fragments that pass the Z depth and stencil test stage ("ZS") 207 are then sent onwards to the rest of the pipeline for processing.

Fragments may then be subject to further culling operations, such as a "forward pixel kill" test by forward pixel kill stage ("FPK") 506, e.g. as described in United States Patent Application Publication No. 2019/0088009 (Arm Limited).

Fragments surviving the forward pixel kill stage ("FPK") 506 then pass to warp packing stage 507. The warp packing stage 507 operates in conjunction with warp manager ("WM") 508 to issue appropriate groups of execution threads ("warps") to execution engine ("EE/MSG") 509 for execution.

In the present embodiment, the execution engine 509 executes a shader program for each execution thread issued to it to generate appropriate render output data, including colour (red, green and blue, RGB) and transparency (alpha, a) data. The shader program is provided by the application 320 and may be complied for execution by the driver 340.

The threads in one group of execution threads ("warp") each execute the shader program in lockstep, one instruction at a time. Grouping execution thread into groups in this manner can improve the execution efficiency of the execution engine 509, because it is possible to share instruction fetch and scheduling resources between all the threads in the group.

In the present embodiment, the warp packing stage 507 generates thread groups ("warps") that each comprise a total of sixteen execution threads. Other groupings of threads would of course be possible.

Typically, each thread in a thread group ("warp") will correspond to, and calculate render output data for, a fixed set of one or more sampling points in the render output. However, in the present embodiment, the number of sampling points (e.g. pixels) that a thread corresponds to depends on the shading rate that is used. To facilitate this, the warp packing stage 507 operates to generate thread groups ("warps") based on the shading rate determined by the shading rate combiner stage 504.

For example, when a 1×1 shading rate is indicated by the shading rate combiner stage 504, the warp packing stage 507 generates a thread group ("warp") that includes one or more threads which will each execute the shader program to generate render output data for one or more sampling points in the render output corresponding to a respective single fine pixel. When a 1×2 shading rate is used, however, the warp packing stage 507 generates a thread group ("warp") that includes one or more threads that will each execute the shader program to generate render output data for one or more sampling points in the render output corresponding to a respective 1×2 coarse pixel. Other shading rates will be handled in a corresponding manner.

Thus, the execution engine 509 can execute execution threads that represent fine pixels and, where a coarser shading rate is being used, execution threads that represent coarse pixels.

Thread groups ("warps") generated by the warp packing stage 507 then pass to the warp manager 508, which issues threads appropriately to the execution engine 509 for execution. The warp manager 508 also stores in warp state storage 510 (in memory 350) information indicating the shading rates associated with thread groups ("warps") issued thread to the execution engine 509.

The execution engine 509 then executes the execution threads within thread groups ("warps") appropriately so as to perform the appropriate shading operations and generate the appropriate render output data for each execution thread, i.e. including colour (red, green and blue, RGB) and transparency (alpha, a) data.

As shown in FIG. 4, a varying unit ("VAR") 511 of the pipeline 10 is responsible for performing interpolation tasks for the execution engine 509. The varying unit 511 interpolates per-vertex attributes (such as per-vertex colours, texture coordinates, etc.), for example from the vertices of a primitive to the current sampling point location. When performing variable rate shading, the varying unit's interpolation can depend on the shading rate, for example where each coarse or fine pixel is to be sampled at its geometrical centre (since, for example, the geometrical centre of a 2×2 coarse pixel is not the same as a 1×1 fine pixel or a 2×1 coarse pixel).

Output data generated by the execution engine 509 is then written appropriately to the tile buffer. If blending is required, any necessary blending operations with data already stored in the tile buffer is performed by blender stage ("BLEND") 210, and the blended data is then written to the tile buffer.

The shading rate information stored in the warp stage storage 510 is read and used to control this writing out of data. For example, in the case of a 1×1 shading rate, a single set of output data values will be written to one or more sampling points in the tile buffer corresponding to a (only) single fine pixel. In the case of a coarser shading rate, a single set of output data values will be written to one or more sampling points in the tile buffer corresponding to a block of plural fine pixels. For example, in the case of a 1×2 shading rate, a single set of output data values will be written to one or more sampling points in the tile buffer corresponding to a block of 1×2 fine pixels. Other shading rates will be handled in a corresponding manner.

Thus, the (blended) output data (values) are written to the tile buffer from where they can, for example, be output to a frame buffer for display. Output Z depth values are also written appropriately to a Z buffer within the tile buffer.

As also shown in FIG. 4, the execution engine 509 comprises a message block ("MSG"), which may be used by the execution engine 509 to communicate with one or more slave units (such as for example the varying unit 511, a texture unit, and the blender 210) by sending message(s). When, for example, the execution engine 509 executes a varying interpolation instruction in its shader program, the execution engine 509 can instruct the message block to create a message which is sent to the varying unit 511. When performing variable rate shading, the message block will read the shading rate from the warp state storage 510, which is prepared by the warp manager 508 when the warp (thread group) is spawned. The shading rate is then supplied to the varying unit 511 and/or the blender 510 as appropriate.

As described above, in Variable Rate Shading (VRS), one method of specifying the shading rate is per-vertex. This means that for each vertex, an associated shading rate is supplied as a vertex attribute.

The conventional approach to provide the per-vertex shading rate to the renderer is to store the per-vertex shading rates in an attribute buffer, together with any other per-vertex attributes. However, reading and writing these values to the attribute buffer will cost memory bandwidth.

Various embodiments relate to a method in which per-vertex shading rates for Variable Rate Shading are efficiently packed (encoded) together with vertex position, such that they can be read and written at no additional bandwidth cost. In particular, when supporting only up to a 2×2 shading rate, it is possible to store the shading rate as part of the post-transform position with no additional memory bandwidth cost.

As described above, before primitives and their vertices can be processed by a graphics processing pipeline, the attributes of the vertices originally defined for a given graphics processing output (e.g. draw call) are usually subjected to an initial so-called "vertex shading" operation that operates to transform the attributes for each originally defined vertex into a desired form for the subsequent graphics processing operations.

This may comprise, in particular, transforming the originally defined vertex position attributes from the world or user space that they are initially defined for to the screen space that the output of the graphics processing system is to be displayed in.

The graphics processing pipeline will typically then snap the screen space vertex position data to an array of screen space vertex positions (a "vertex position grid") that corresponds to an array of screen space vertex positions (a "vertex position grid") that will be used when rasterising and rendering the primitives for the graphics processing output.

In particular each post-transform positon (comprising an X and Y coordinate) is snapped to a $\frac{1}{256}$ grid. This snapping is defined by the DirectX standard, which requires a graphics processor to use 8 bits of fractional precision. So, by snapping all positions to a $\frac{1}{256}$ grid, at most 8 bits of fractional precision is needed.

Since the post-transform X and Y coordinates are snapped to a $\frac{1}{256}$ pixel grid, they are not unconstrained 32 bit floating point values. The Applicant has recognised that this means that it is possible to encode all valid positions in 31 bits without loss of information.

Multiple mechanism to pack each coordinate value into 31 bits exist. However, an exemplary method of encoding the position is to apply a load exponent (ldexp) operation such as a ldexp(−141) operation.

The load exponent operation is a standard operation which is defined for IEEE 754 floating point values. Its purpose is to multiply an input value with "2 to the power of the new exponent", i.e. ldexp(x, exp)=$x*2^{exp}$.

This has the property that a floating point value can be shifted to a representation having a lower exponent, while retaining the mantissa values. In the present embodiment, where position values are snapped to the grid, shifting using the largest exponent does not shift out any non-zero mantissa bits.

The smallest non-zero position is $\frac{1}{256}$=0.00390625. By multiplying this with $2^{-141}$, the smallest possible position ($\frac{1}{256}$) become mapped to the smallest expressible denormal value:

$\frac{1}{256}$=0x3b800000=>0x00000001

The largest exponent to be expressed is:

0x7F000000=>0x38800000

Inf and NaN may be mapped as:

0x7F800000=>0x39000000

Hence no information is lost, and this is a lossless mapping. This mapping free ups one bit in the floating point encoding. In particular, bit 30 is unused.

Both X and Y positions can be mapped this way, which free up 2 bits, namely bits 30 in the X and Y positions respectively. These 2 bits can be used to encode a 4 entry enum to indicate each of four shading rates, e.g. each of 1×1, 1×2, 2×1, and 2×2 shading rates.

It would also be possible to use these bits to encode some other vertex attribute value.

It will be appreciated that in the present embodiment, the post-transform position become a compressed value which needs an encode during write and a decode for read access.

The post-transform position is written to memory, e.g. by the position shader, by writing the output value decorated by the shading rate. The post-transform position is written to memory by a store converter instruction, which is also responsible for the snapping to the $\frac{1}{256}$ pixel grid.

In the present embodiments, the shading rate is supplied to the store converter unit which in addition to the snapping also performs the encoding of the position and shading rate values.

Figure 5:
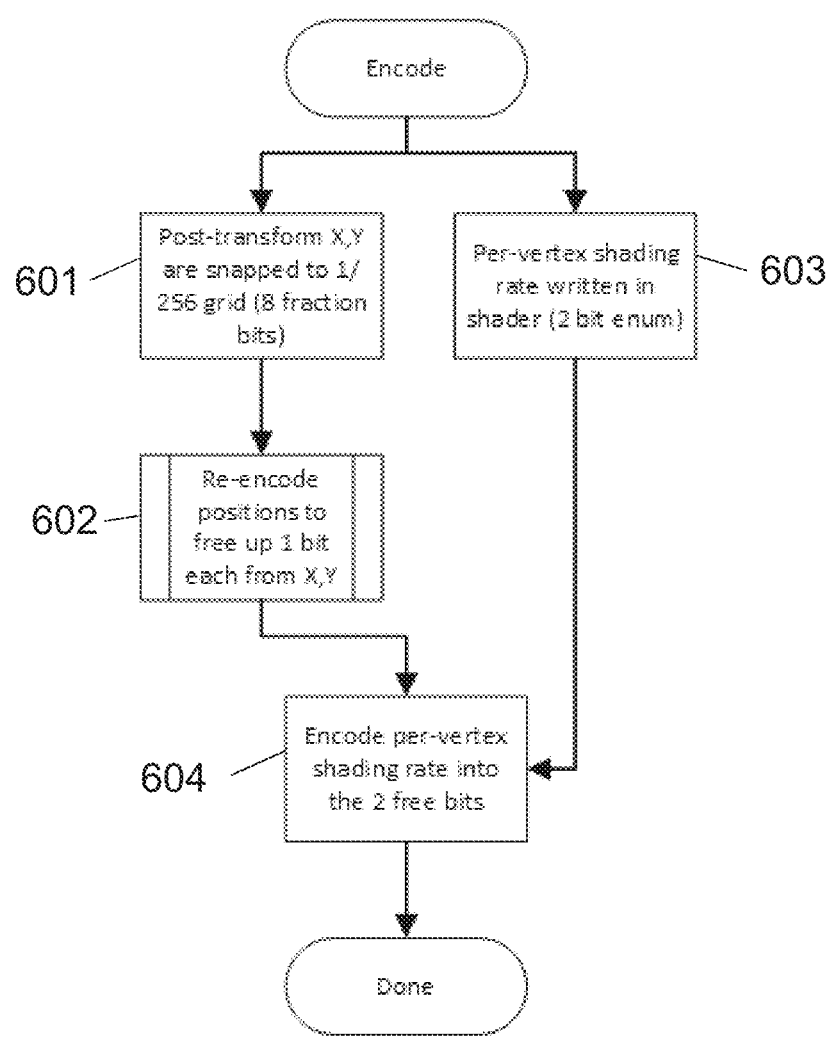
FIG. 5 is a flowchart illustrating an encoding process in accordance with various embodiments.

FIG. 5 illustrates schematically a process of encoding the per-vertex shading rate into the vertex position.

As shown in FIG. 5, the post transform X and Y coordinates are snapped to a $\frac{1}{256}$ grid (step 601). Each of the coordinates is then re-encoded (as described above), in order to free up one bit (and so a total of two bits) (step 602).

The per-vertex shading rate is written in a shader as a 2 bit enum (step 603). The per-vertex shading rate is then encoded into the 2 free bits of the post transform vertex coordinates (step 604).

Figure 6:
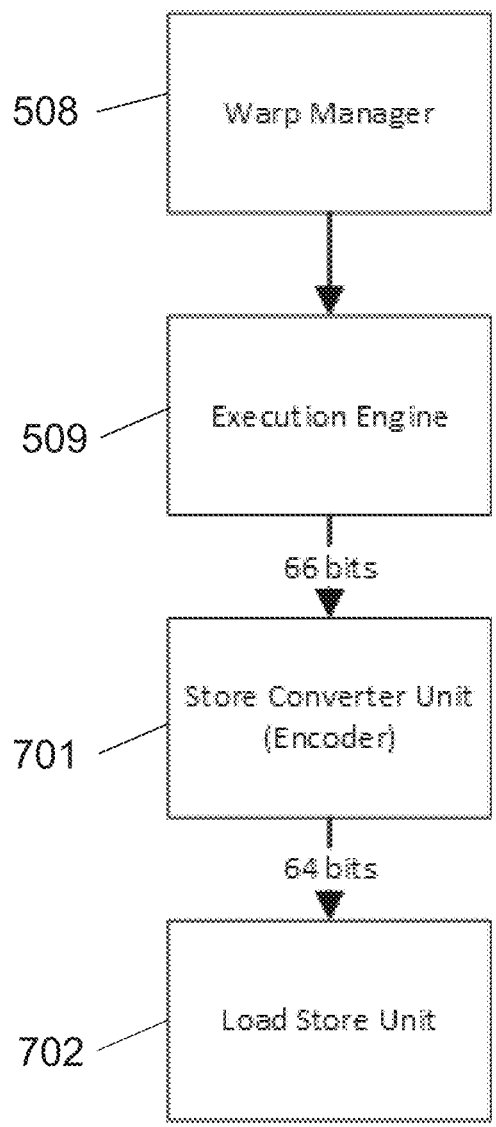
FIG. 6 shows schematically part of a graphics processing pipeline in accordance with various embodiments.

FIG. 6 illustrates schematically the parts of the pipeline 10 that are responsible for performing encoding of the per-vertex shading rate into the vertex position.

As shown in FIG. 6, the warp manager 508 issues threads to the execution engine 509 for execution. The execution engine 509 then executes the execution threads within thread groups ("warps") appropriately so as to perform the appropriate vertex shading operations.

The vertex shading operation operates to transform the attributes for each vertex into a desired form for the subsequent graphics processing operations. This may comprise, in particular, transforming the originally defined vertex position attributes from the world or user space that they are initially defined for to the screen space that the output of the graphics processing system is to be displayed in.

Thus, an output from the execution engine 509 is a screen space (X and Y) coordinate for each vertex. As described above, another output is a per-vertex shading rate, in the form of a 2-bit enum. At this stage, each coordinate is represented using a 32 bit floating point representation, and so as show in FIG. 6, the execution engine 509 outputs 66 bits (64 bits for the coordinates and 2 bits for the shading rate) in respect of each vertex.

A store converter unit 701 then operates to convert the originally defined vertex position coordinates to a lower precision form. This conversion has the effect of "snapping" the originally defined vertex positions (e.g. in floating point form) to an array of vertex positions that can be represented using the lower precision vertex position format (e.g., a 16.8 fixed-point coordinate form).

(It should be noted that, in embodiments where clipping is not supported, it is necessary to retain the vertex position coordinates in floating point format at this stage (and they cannot be converted into a 16.8 fixed point representation), in order to support a sufficiently high rendertarget resolution.)

In the present embodiment, the store converter unit 701 is also responsible for re-encoding the coordinates so as to free up one bit per coordinate (i.e. 2 bits in total), and to then encode the per-vertex shading rate into the 2 free bits.

As shown in FIG. 6, an output from the store converter unit 701 is a 64 bit representation of the X, Y coordinates and the shading rate for each vertex. A load store unit 702 operates to store these values in memory.

In the present embodiment, the post-transform position may be read by one or more or each of three units.

In particular, the tiler 205 may decode the X,Y positions and can simply disregard the shading rates.

The FFE vertex loader 503 may need both the shading rate and the position. As described above, this means that the vertex loader 503 can get the shading rates without any additional bandwidth, since they are not stored in a separate attribute buffer.

Figure 7:
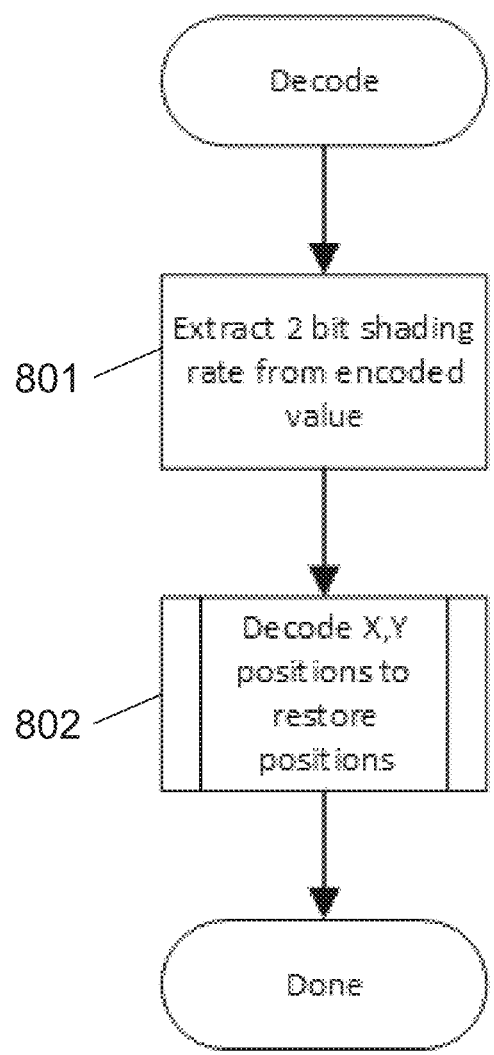
FIG. 7 is a flowchart illustrating a decoding process in accordance with various embodiments.

FIG. 7 illustrates schematically this process of decoding. As shown in FIG. 7, the 2 bit shading rate is initially extracted from the encoded value step 801). Then the X, Y positions of the vertex are decoded (step 802).

Figure 8:
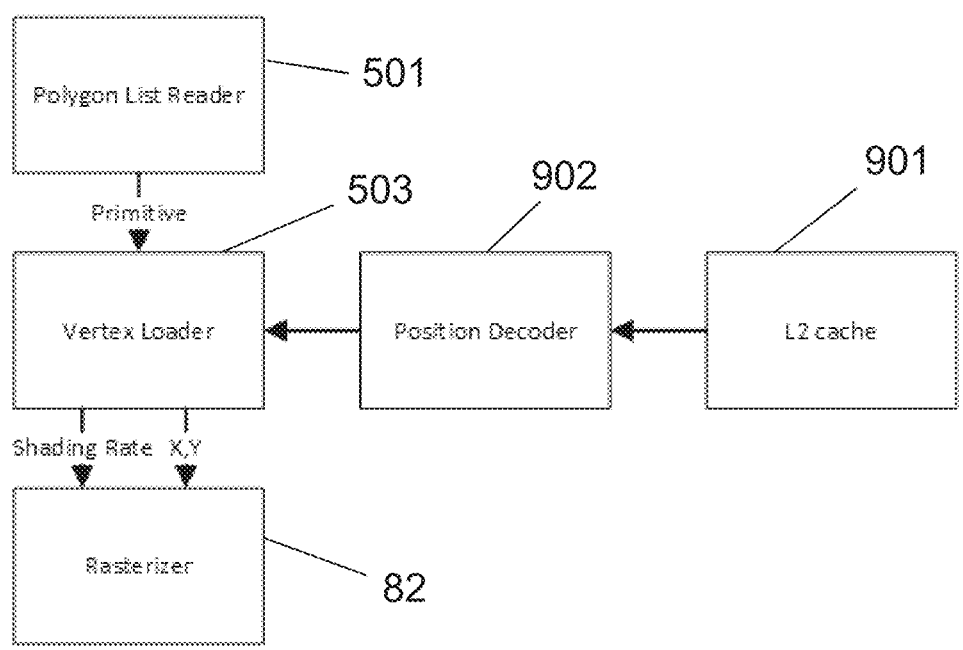
FIG. 8 shows schematically part of a graphics processing pipeline in accordance with various embodiments.

FIG. 8 illustrates schematically parts of the pipeline 10 that are responsible for performing this decoding. As shown in FIG. 8, the polygon list reader (PLR) 501 reads the appropriate primitive list(s) for that tile from the memory 350 to identify the primitives that are to be rendered for the tile.

The vertex loader ("VL") 503 reads the appropriate processed vertex data for primitives to be rendered from the memory 350, including the X, Y position and the per-vertex shading rate. To do this, the encoded value may be read from an L2 cache 901, and a position decoder 902 may be provided to perform the operations illustrate by FIG. 7. In this way, the vertex loader ("VL") 503 can provide the decoded X, Y position and the per-vertex shading rate to the rasteriser 82 as appropriate for the subsequent rasterising and rendering operations (as described above.)

It will be appreciated that various embodiments provide a mechanism that allows per-vertex shading rates in variable rate shading to be provided with zero memory bandwidth cost. This is achieved, in embodiments at least, by encoding the shading rate together with the position.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical applications, to thereby enable others skilled in the art to best utilise the technology, in various embodiments and with various modifications as are suited to the particular use contemplated. It is intended that the scope be defined by the claims appended hereto.

What is claimed is:

1. A method of operating a graphics processor that is configured to execute a graphics processing pipeline, the method comprising:
   providing information representing a vertex of a plurality of vertices that define one or more primitives to be rendered by the graphics processing pipeline, wherein the information comprises at least a position of the vertex and one or more other vertex attributes;
   snapping the position of the vertex to an array of vertex positions so as to produce one or more first representations of the position of the vertex;
   converting each of one or more of the one or more first representations of the position of the vertex into a second representation of the position of the vertex, wherein at least one bit of the second representation of the position of the vertex is unused to represent the position of the vertex;
   using the at least one bit of the second representation of the position of the vertex to represent the one or more other vertex attributes, so as to form a representation of both the position of the vertex and the one or more other vertex attributes; and
   storing a representation of both the position of the vertex and the one or more other vertex attributes.

2. The method of claim 1, wherein the position of the vertex comprises a first (X) screen space coordinate and a second (Y) screen space coordinate.

3. The method of claim 1, wherein each of the one or more first and/or second representations comprises a floating point representation.

4. The method of claim 3, wherein each of the one or more first and/or second representations comprises a 32-bit floating point representation.

5. The method of claim 1, wherein converting a first representation into a second representation comprises:
   converting a first representation of a first screen space coordinate (X) into a second representation of the first screen space coordinate (X), wherein at least one bit of the second representation of the first screen space coordinate (X) is unused to represent the first screen space coordinate (X); and
   converting a first representation of a second screen space coordinate (Y) into a second representation of the second screen space coordinate (Y), wherein at least one bit of the second representation of the second screen space coordinate (Y) is unused to represent the second screen space coordinate (Y).

6. The method of claim 1, wherein converting a first representation into a second representation comprises:
   converting a first representation into a second representation such that a selected bit of the second representation is unused.

7. The method of claim 1, wherein converting a first representation into a second representation comprises subjecting the first representation to a load exponent (ldexp) operation.

8. The method of claim 1, wherein the one or more other vertex attributes comprises a shading rate for the vertex.

9. The method of claim 8, further comprising:
   reading the stored representation of both the position of the vertex and the shading rate for the vertex;
   determining the shading rate for the vertex from the read representation of both the position of the vertex and the shading rate for the vertex;
   determining, using the determined shading rate for the vertex, a shading rate to be used when rendering a primitive defined by the vertex; and
   rendering the primitive using the determined shading rate.

10. The method of claim 8, wherein the shading rate for the vertex comprises one of a 1×1, 1×2, 2×1 or 2×2 shading rate.

11. A graphics processor configured to execute a graphics processing pipeline, the graphics processor comprising:
   an information receiving circuit configured to receive information representing a vertex of a plurality of vertices that define one or more primitives to be rendered by the graphics processing pipeline, wherein the information comprises at least a position of the vertex and a one or more other vertex attributes;
   a position snapping circuit configured to snap the position of the vertex to an array of vertex positions so as to produce one or more first representations of the position of the vertex;

a conversion circuit configured to convert each of one or more of the one or more first representations of the position of the vertex into a second representation of the position of the vertex, wherein at least one bit of the second representation of the position of the vertex is unused to represent the position of the vertex;

a processing circuit configured to use the at least one bit of the second representation of the position of the vertex to represent the one or more other vertex attributes, so as to form a representation of both the position of the vertex and the one or more other vertex attributes; and a storing circuit configured to store a representation of both the position of the vertex and the one or more other vertex attributes.

12. The graphics processor of claim 11, wherein the position of the vertex comprises a first (X) screen space coordinate and a second (Y) screen space coordinate.

13. The graphics processor of claim 11, wherein each of the one or more first and/or second representations comprises a floating point representation.

14. The graphics processor of claim 11, wherein the conversion circuit is configured to convert a first representation into a second representation by:

converting a first representation of a first screen space coordinate (X) into a second representation of the first screen space coordinate (X), wherein at least one bit of the second representation of the first screen space coordinate (X) is unused to represent the first screen space coordinate (X); and converting a first representation of a second screen space coordinate (Y) into a second representation of the second screen space coordinate (Y), wherein at least one bit of the second representation of the second screen space coordinate (Y) is unused to represent the second screen space coordinate (Y).

15. The graphics processor of claim 11, wherein the conversion circuit is configured to convert a first representation into a second representation by:

converting a first representation into a second representation such that a selected bit of the second representation is unused.

16. The graphics processor of claim 11, wherein the conversion circuit is configured to convert a first representation into a second representation by subjecting the first representation to a load exponent (ldexp) operation.

17. The graphics processor of claim 11, wherein the one or more other vertex attributes comprises a shading rate for the vertex.

18. The graphics processor of claim 17, further comprising:

a read circuit configured to read the stored representation of both the position of the vertex and the shading rate for the vertex;

a decoding circuit configured to determine the shading rate for the vertex from the read representation of both the position of the vertex and the shading rate for the vertex;

a rate combiner circuit configured to determine, using the determined shading rate for the vertex, a shading rate to be used when rendering a primitive defined by the vertex; and a renderer configured to render the primitive using the determined shading rate to generate a render output.

19. The graphics processor of claim 17, wherein the shading rate for the vertex comprises one of a 1×1, 1×2, 2×1 or 2×2 shading rate.

20. A non-transitory computer readable storage medium storing computer software code which when executing on a processor performs a method of operating a graphics processor, the method comprising:

providing information representing a vertex of a plurality of vertices that define one or more primitives to be rendered by the graphics processing pipeline, wherein the information comprises at least a position of the vertex and one or more other vertex attributes;

snapping the position of the vertex to an array of vertex positions so as to produce one or more first representations of the position of the vertex;

converting each of one or more of the one or more first representations of the position of the vertex into a second representation of the position of the vertex, wherein at least one bit of the second representation of the position of the vertex is unused to represent the position of the vertex;

using the at least one bit of the second representation of the position of the vertex to represent the one or more other vertex attributes, so as to form a representation of both the position of the vertex and the one or more other vertex attributes; and storing a representation of both the position of the vertex and the one or more other vertex attributes.

* * * * *